(12) United States Patent
Baker et al.

(10) Patent No.: US 8,114,192 B2
(45) Date of Patent: Feb. 14, 2012

(54) GAS SEPARATION PROCESSES USING MEMBRANE WITH PERMEATE SWEEP TO RECOVER REACTION FEEDSTOCKS

(75) Inventors: Richard W. Baker, Palo Alto, CA (US); Johannes G. Wijmans, Menlo Park, CA (US); Timothy C. Merkel, Menlo Park, CA (US)

(73) Assignee: Membrane Technology & Research, Inc, Menlo Park, CA (US)

( * ) Notice: Subject to any disclaimer, the term of this patent is extended or adjusted under 35 U.S.C. 154(b) by 340 days.

(21) Appl. No.: 12/454,043

(22) Filed: May 11, 2009

(65) Prior Publication Data

US 2009/0277326 A1 Nov. 12, 2009

Related U.S. Application Data

(60) Provisional application No. 61/127,415, filed on May 12, 2008.

(51) Int. Cl.
*B01D 53/22* (2006.01)
(52) U.S. Cl. ............. 95/45; 95/47; 95/50; 95/54; 95/55; 96/4; 96/9; 423/226; 423/414; 423/579; 423/359; 422/187; 422/234; 585/818; 585/819; 585/903
(58) Field of Classification Search ............ 95/45, 47, 95/50, 55, 54; 96/4, 7, 9; 423/226, 414, 423/579, 359; 422/187, 234; 585/818, 819, 585/903
See application file for complete search history.

(56) References Cited

U.S. PATENT DOCUMENTS

| | | | | |
|---|---|---|---|---|
| 4,235,983 A * | 11/1980 | Steigelmann et al. | ............ | 95/50 |
| 4,824,443 A * | 4/1989 | Matson et al. | .................... | 95/44 |
| 4,931,070 A | 6/1990 | Prasad | | |
| 5,034,126 A | 7/1991 | Reddy et al. | | |
| 5,240,471 A | 8/1993 | Barbe et al. | | |
| 5,354,547 A * | 10/1994 | Rao et al. | ........................... | 95/50 |
| 5,455,016 A * | 10/1995 | Choe et al. | ....................... | 95/47 |
| 5,500,036 A | 3/1996 | Kalthod | | |
| 5,641,337 A | 6/1997 | Arrowsmith et al. | | |
| 5,681,433 A | 10/1997 | Friesen et al. | | |
| 5,753,010 A * | 5/1998 | Sircar et al. | ....................... | 95/50 |
| 5,843,209 A | 12/1998 | Ray et al. | | |
| 6,114,400 A * | 9/2000 | Nataraj et al. | ..................... | 95/54 |
| 6,214,066 B1 * | 4/2001 | Nataraj et al. | ..................... | 95/45 |
| 6,395,243 B1 * | 5/2002 | Asen et al. | ..................... | 423/219 |
| 6,478,852 B1 | 11/2002 | Callaghan et al. | | |
| 2002/0155061 A1 * | 10/2002 | Prasad et al. | .................. | 423/652 |
| 2011/0033370 A1 * | 2/2011 | Ayala et al. | ................ | 423/567.1 |

OTHER PUBLICATIONS

G. Margaret Wells, Handbook of Petrochemicals and Processes, 1991, pp. 9-16, 43-46, and 48-51, Gower Publishing Company, Brookfield, VT.
US 4,981,498, 01/1991, Bikson et al. (withdrawn)

* cited by examiner

*Primary Examiner* — Jason M Greene
(74) *Attorney, Agent, or Firm* — J. Furrant; K. Bean (57) ABSTRACT

A gas separation process for treating off-gas streams from reaction processes, and reaction processes including such gas separation. The invention involves flowing the off-gas across the feed side of a membrane, flowing a sweep gas stream, usually air, across the permeate side, and passing the permeate/sweep gas mixture to the reaction. The process recovers unreacted feedstock that would otherwise be lost in the waste gases in an energy efficient manner.

20 Claims, 9 Drawing Sheets

FIG. 3
(not in accordance with the invention)

FIG. 4
(not in accordance with the invention)

FIG. 5
(not in accordance with the invention)

(not in accordance with invention)

FIG. 8

(not in accordance with invention)

FIG. 9

(not in accordance with invention)

GAS SEPARATION PROCESSES USING MEMBRANE WITH PERMEATE SWEEP TO RECOVER REACTION FEEDSTOCKS

This application claims the benefit of U.S. Provisional Application Ser. No. 61/127,415, filed May 12, 2008 and incorporated herein by reference.

FIELD OF THE INVENTION

The invention relates to membrane-based gas separation processes, and specifically to processes using a sweep gas on the permeate side of the membranes to recover reaction feedstocks.

BACKGROUND OF THE INVENTION

Many reaction processes produce off-gas streams containing unreacted components. The manufacture of chemicals from petrochemical feedstocks, such as ethylene, propylene, butene or butane, is an important group of processes of this type. The off-gas streams from such processes are difficult to treat in ways that are both technically and economically practical. As a result, the off-gases are often sent to a fuel line at best, or purged from the process and simply vented or flared, causing atmospheric pollution and wasting resources.

There remains a need for better treatment techniques.

Gas separation by means of membranes is a well established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070; 4,981,498 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

SUMMARY OF THE INVENTION

The invention is a gas separation process for treating off-gas streams from reaction processes, and reaction processes that include such a gas separation operation. The process is applicable to reactions that do not run to completion in one pass, that is, reactions from which a stream containing unreacted feedstock is withdrawn.

The processes involve flowing the off-gas stream that includes some unreacted reagent across the feed side of a membrane, and flowing a sweep gas stream containing a second reagent across the permeate side. Preferentially permeating components pass from the feed side to the permeate side and are picked up into the sweep stream. The sweep/permeate gas is withdrawn from the permeate side and returned to the reaction process. In this way, the first reagent is recovered and returned to the reaction with the second reagent.

The processes of the invention are particularly useful for petrochemical manufacturing, that is, the manufacture of organic compounds from petrochemical feedstocks, such as $C_{1-6}$ hydrocarbon feedstocks. The off-gas from such processes typically comprises a mixture of unreacted feedstock(s) with inert components or contaminants.

Membranes that may be used to carry out the separations should exhibit high permeance for the feedstock component that is to be removed and recovered, as well as high selectivity for that component over at least one other component of the stream to be treated.

If the gas to be removed from the stream is an organic feedstock, such as a light olefin or paraffin, it is preferred that the membrane exhibit a selectivity in favor of the organic feedstock over nitrogen of at least 5, and most preferably at least 10, under process operating conditions.

It is also preferred that the organic feedstock permeance be at least about 100 gpu, more preferably at least about 300 gpu, and most preferably at least about 500 or 1,000 gpu under the process operating conditions.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements as is well known in the art. Any number of membrane modules may be used.

The process may be augmented by operating the membrane unit with higher total pressure on the feed side than on the permeate side, thereby increasing the transmembrane driving force for permeation.

It is highly preferred that the feed gas flow direction across the membrane on the feed side and the sweep gas flow direction across the membrane on the permeate side are substantially countercurrent to each other. In the alternative, the relative flow directions may be substantially crosscurrent, or less preferred, cocurrent.

As it encompasses the reaction process and the reagent recovery steps, the process involves feeding at least two streams, each containing at least one component or reagent, the components being designated A and B hereinafter for convenience, to a reaction zone. The components react to form the desired reaction product and leave a waste gas or off-gas stream that contains an unreacted quantity of component A, as well as one or more inert gases, designated component C, that entered the reaction zone with one or both reagent streams. This off-gas stream is treated by membrane separation to recover the reagent for return to the reaction process.

The membrane separation step is carried out by passing the waste stream containing the unreacted component A across the feed side of the membrane. The membrane is chosen to be selectively permeable to the unreacted component A over component C. For preference, the membrane should also be relatively impermeable to component B, to prevent loss of reagent B from the process.

A sweep gas containing reagent B is passed across the permeate side of the membrane and picks up the preferentially permeating unreacted component A. This stream is then withdrawn from the membrane unit and is returned to the reactor to form at least part of the feed to the reaction zone. A stream depleted in component A is withdrawn from the feed side of the membranes and discharged from the process.

By using the second-reagent-containing stream as sweep gas, the membrane separation step is carried out in a very energy efficient manner, and without introducing any additional unwanted components into the reaction zone.

The process is particularly useful in applications that are energy-sensitive, as may be the case when very large streams are to be processed, or when installing or operating large compressors or vacuum pumps is too costly.

The process is also particularly useful in separations that are pressure-ratio limited, as will be explained in more detail below.

The invention in a basic embodiment comprises the following steps:
(a) providing a reaction zone;
(b) introducing a first reaction stream comprising a component A and a second reaction stream comprising a component B into the reaction zone;
(c) reacting components A and B, thereby forming a reaction product in a reaction mixture;
(d) withdrawing at least a portion of the reaction mixture from the reaction zone;
(e) removing at least a portion of the reaction product from the withdrawn portion of the reaction mixture to form a reaction product stream and a non-product stream containing unreacted component A and at least one inert component C;
(f) providing a membrane having a feed side and a permeate side, and being selectively permeable to component A over component C;
(g) passing at least a portion of the non-product stream across the feed side;
(h) passing a stream containing component B as a sweep stream across the permeate side;
(i) withdrawing from the feed side a vent stream depleted in component A compared with the non-product stream;
(j) withdrawing from the permeate side a permeate stream comprising component A and component B;
(k) recirculating at least a portion of the permeate stream to the reaction zone as at least part of the second reaction stream.

The process is applicable to any reaction that fails to run to completion, and that produces waste gases that are a mix of useful reagent and inert or undesirable contaminants.

We believe the process is particularly useful as an efficient way to carry out oxidation reactions, including, but not limited to, the reaction of basic organic feedstocks, such as $C_{1-6}$ hydrocarbons, with oxygen to form various petrochemical products.

In this case, the process involves feeding a stream containing the organic feedstock, such as propylene or n-butane, for example, and a stream containing oxygen, such as air, oxygen-enriched air, or purified oxygen, to the reactor, to form the desired reaction product.

After a separation step to recover the product from the raw reaction mixture, an off-gas containing unreacted feedstock is left. Typically, the off-gas also contains nitrogen, argon or other inert gas, which enters as part of the incoming air or oxygen stream, or another organic compound, such as a paraffin, that is inert in the desired reaction, which enters as part of the incoming organic feedstock stream.

This off-gas stream is treated by membrane separation to recover organic feedstock for return to the reaction process. The membrane is chosen to be selective to the organic feedstock over nitrogen or other inert component. The sweep gas is formed by at least part of the air, oxygen-enriched air or oxygen stream that is subsequently to be fed to the reactor. The organic feedstock permeates and is picked up by the sweep gas and returned with the air or oxygen stream to the reactor.

The invention as it relates to oxidation of organic feedstocks comprises the following steps:
(a) performing a reaction step in a reaction zone, by reacting an organic feedstock chosen from the group consisting of methanol, ethylene, propylene, butylenes, isoprene, ethane, n-butane, iso-butane, benzene, toluene, cyclohexane, cumene, o-xylene and p-xylene, with oxygen, thereby forming an organic product;
(b) withdrawing from the reaction zone a crude organic product stream comprising the organic product, the organic feedstock, and an inert gas;
(c) removing at least a portion of the organic product from the crude organic product stream to form a non-product stream;
(d) providing a membrane having a feed side and a permeate side, and being selectively permeable to the organic feedstock over nitrogen;
(e) passing at least a portion of the non-product stream across the feed side;
(f) passing air, oxygen-enriched air or oxygen as a sweep stream across the permeate side;
(g) withdrawing from the feed side an organic-feedstock depleted vent stream;
(h) withdrawing from the permeate side a permeate stream comprising oxygen and the organic feedstock;
(i) recirculating at least a portion of the permeate stream to the reaction zone.

Such processes are especially useful for manufacturing maleic anhydride, acetic acid, acrylonitrile, acrylic acid and formic acid, for example.

DETAILED DESCRIPTION OF THE INVENTION

Gas percentages given herein are by volume unless stated otherwise.

The invention is a gas separation process for treating off-gas streams from reaction processes, and reaction processes including such gas separation. The invention is applicable to any reaction that does not run to completion, so that a mix of valuable unreacted feedstock and waste components, such as inert gases or unwanted or undesirable reaction products, forms part of the reactor output.

Figure 1:
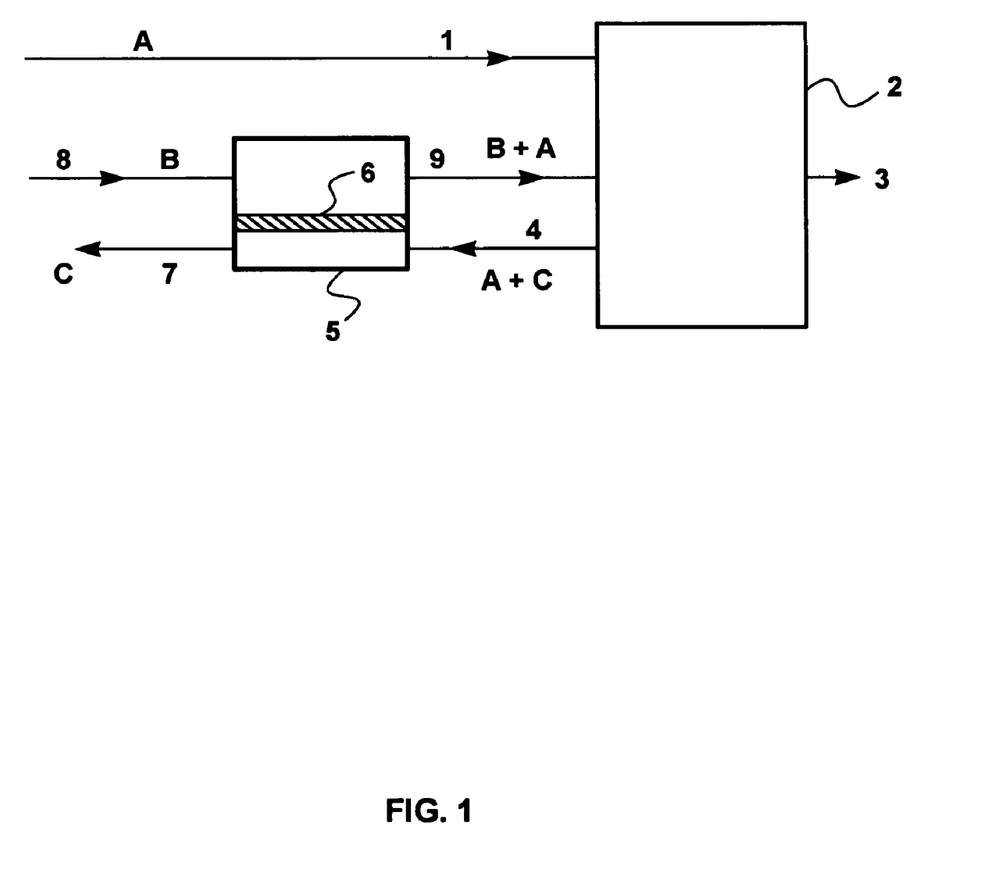
FIG. 1 is a schematic drawing of a flow scheme for a basic embodiment of the invention as it relates to reaction processes in general.

A flow scheme of a basic embodiment of the invention, including a reaction step and a membrane separation step, is shown in FIG. 1. Referring to this figure, a feed stream, 1, containing a reagent, A, is introduced to a reaction zone, 2, where a reaction takes place. Separated streams of desired reaction product, stream 3, and off-gas, stream 4, are withdrawn.

Off-gas stream 4 contains a certain amount of unreacted feedstock, A, as well as one or more inert gases, C, that entered the reaction zone in one or both of the reagent streams, for example with reagent B. At least a portion of this off-gas stream passes as a feed stream to membrane separation step or unit, 5, containing membranes, 6, that are selectively permeable to component A over component C.

A sweep gas stream, 8, containing a second reagent, B, that takes part in the reaction, is passed across the permeate side of the membrane.

The sweep stream flows across the permeate side and picks up the preferentially permeating unreacted component A. The resulting permeate stream, 9, is withdrawn from the membrane unit and forms at least part of the feed of component B to the reaction zone. Optionally an additional stream of component B may pass directly to the reaction zone without passing across the permeate side.

Stream, 7, depleted in feedstock A, is discharged from the process.

The reaction step 2 may be of any type, limited only in that it results in an off-gas containing unreacted feedstock component that it is desirable to recover, such as for economic or environmental reasons.

Numerous off-gas generating reaction processes for the manufacture of intermediates and industrial chemicals are known and are described in the literature, as, for example, in *Shreve's Chemical Process Industries*, G. T. Austin, (McGraw-Hill, 1984) or *Chemistry of Petrochemical Processes*, S. Matar and L. F. Hatch, ($2^{nd}$ Edition, Butterworth-Heinemann, 2001). Such processes are familiar to those of skill in the art and do not require individual detailed descriptions herein.

Preferably the reaction step involves the manufacture of an organic chemical from a light petrochemical feedstock. Representative feedstocks are $C_{1-6}$ hydrocarbons, such as methanol, ethylene, propylene, butylenes, isoprene, ethane, n-butane, iso-butane, benzene, toluene, cyclohexane, cumene, o-xylene and p-xylene. Representative organic chemical products include alcohols, aldehydes, ketones, acids, acids, and esters. Specific examples of chemicals that can be made by the process of the invention are maleic anhydride, acetic acid, acrylonitrile, acrylic acid and formic acid.

In the text that follows, the invention is described and illustrated principally as it relates to the production of maleic anhydride. This has been done to facilitate a clear description of the invention; those of skill in the art will appreciate that the scope of the invention includes and is applicable to many other chemical manufacturing reactions.

For example, a number of representative chemical manufacturing operations are described in *Handbook of Petrochemicals and Processes*, G. M. Wells (Gower Publishing Company, 1991).

For instance, the production of acetic acid from n-butane by air oxidation, (page 11 of Wells), produces a similar butane off-gas to that generated by maleic anhydride manufacture, but at a higher pressure. Formic acid and propionic acid may be made by a similar route.

Figure 7:
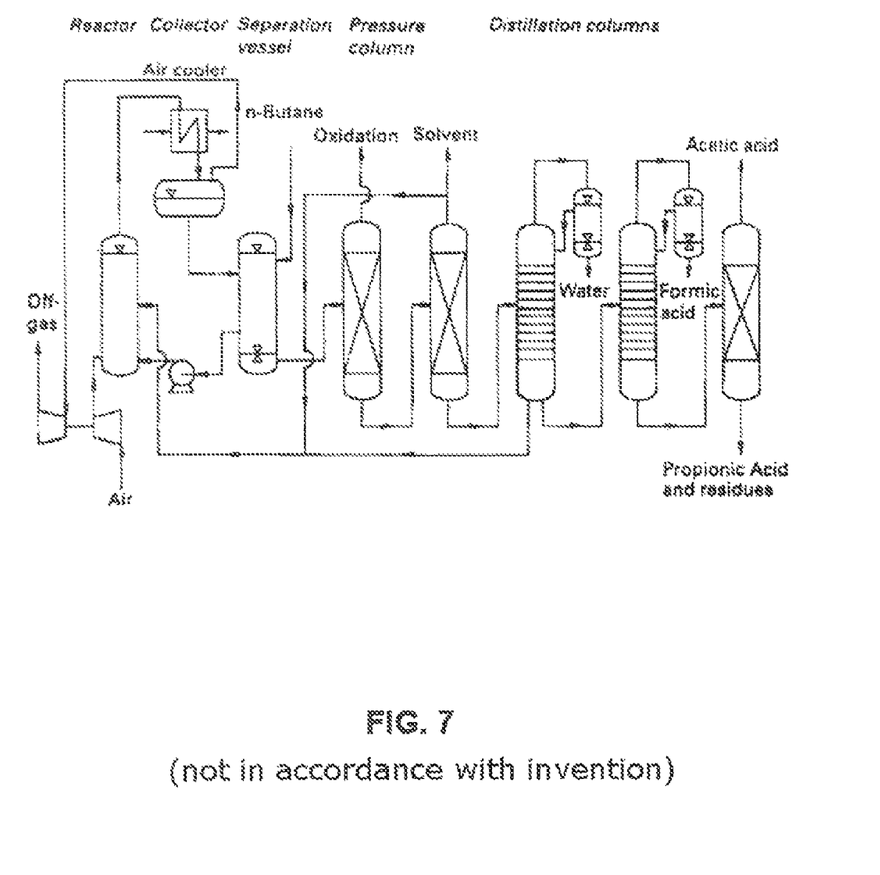
FIG. 7 is a typical production train for making acetic acid reproduced from *Handbook of Petrochemicals and Processes*, G. M. Wells (Gower Publishing Company, 1991).

The figure from page 11 of Wells is reproduced as FIG. 7, and the production train as shown in that figure corresponds to reactor 2 in FIG. 1. The process of the invention in this case includes using a membrane separation step, 5, by running the off-gas stream across the feed side of the membrane as stream 4 and the incoming air across the permeate side as stream 8.

Figure 8:
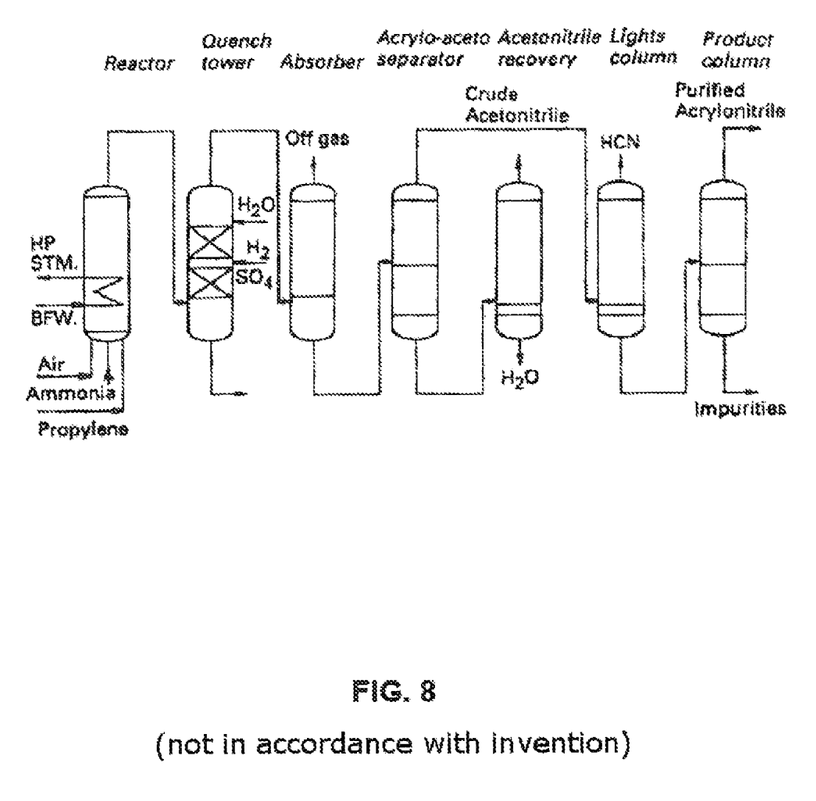
FIG. 8 is a typical production train for making acrylonitrile reproduced from *Handbook of Petrochemicals and Processes*, G. M. Wells (Gower Publishing Company, 1991).

Another example is the production of acrylonitrile from propylene by the Sohio process, as described on page 49 of Wells. The figure from page 49 is reproduced here as FIG. 8. Again, the production train as shown in that figure corresponds to reactor 2 in FIG. 1. The off-gas overhead from the absorber is propylene in nitrogen, with some propane. The process of the invention in this case includes using a membrane separation step, 5, by running the off-gas stream from the absorber across the feed side of the membrane as stream 4 and the incoming air to the base of the reactor across the permeate side as stream 8.

Figure 9:
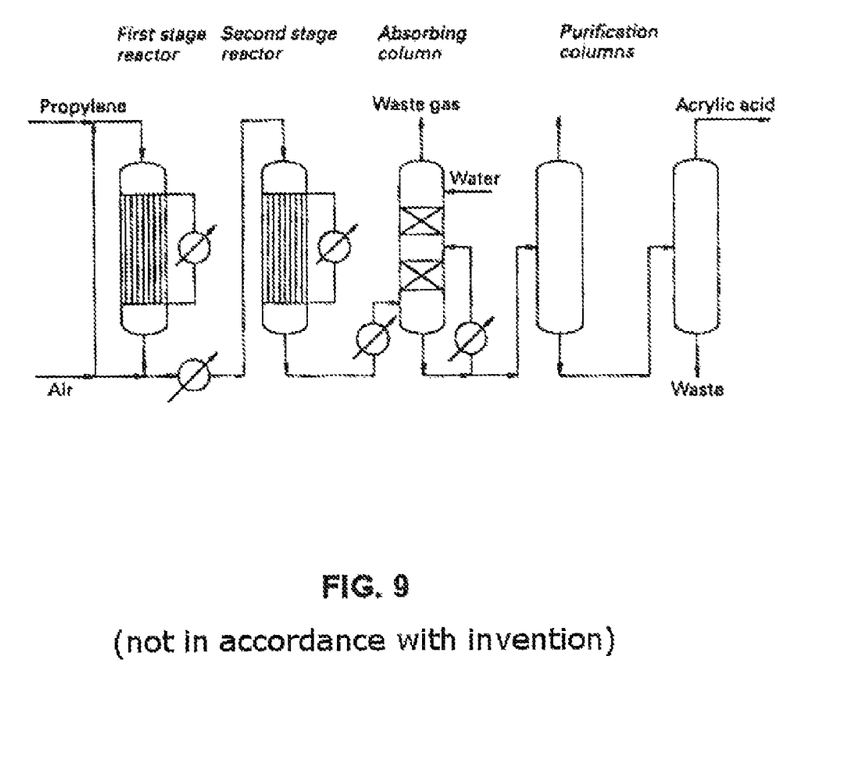
FIG. 9 is a typical production train for making acrylic acid reproduced from *Handbook of Petrochemicals and Processes*, G. M. Wells (Gower Publishing Company, 1991).

Yet another example is the production of acrylic acid from propylene, as described on page 49 of Wells. The figure from page 44 is reproduced here as FIG. 9. Yet again, the production train as shown in that figure corresponds to reactor 2 in FIG. 1. The waste gas overhead from the absorbing column is mostly nitrogen with some unreacted propylene and oxygen at about 2 bar pressure. The process of the invention in this case includes using a membrane separation step, 5, by running the waste gas stream across the feed side of the membrane as stream 4 and the incoming air to the base of the reactor across the permeate side as stream 8.

Returning to the description of FIG. 1, for performing the reaction step, the reactor or reactors themselves may be of any kind that provides for good contact between feedstocks and catalyst, if a catalyst is used, and for good temperature control and removal of waste heat, such as shell-and-tube reactors, stirred tank reactors, and fluidized bed reactors. One or multiple reactors may be involved in the process, with the individual reactors carrying out the same or different unit operations. The exact composition of the reaction mixture may be varied in conjunction with pressure, temperature and flow rate to provide a desired overall yield, efficiency per pass and so on. Such operating details are again well known in the art and are described in the above references, among others.

Typically, the raw effluent taken from the reaction steps will be a mix of the desired reaction product, unreacted feedstock, inert contaminants, by-products, such as carbon dioxide, water or light hydrocarbons, and catalyst. The raw effluent will usually be sent to a product recovery train (encompassed within box 2 in FIG. 1) to separate the desired product from the other components, thereby yielding at least the desired product stream, 3, and the off-gas stream, 4.

The specific unit operations of the product recovery train 5 will vary from process to process, but may include absorption, adsorption, condensation, stripping, distillation, or any other appropriate separation technique, including even membrane separation.

Turning to the membrane separation step, 5, as mentioned in the summary section, the membranes used in this step should exhibit high permeance for the feedstock component that is to be removed and recovered, as well as high selectivity for that component over the inert or waste component(s) that is to be discharged in stream 7. Preferably, the membranes should also exhibit a relatively low permeance for component B, to reduce counter-permeation of reagent B from the permeate side to the feed side. By relatively low permeance, we mean that the permeance for B should be less than half the permeance for component A, more preferably less than 20% of the permeance of component A and most preferably less than 10% of the permeance of component A.

Any membrane with suitable performance properties may be used. For recovering organic feedstock vapors, the membrane preferably has a selective layer made from an elastomeric or rubbery polymer. Examples of polymers that can be used to make elastomeric membranes, include, but are not limited to, nitrile rubber; neoprene; polysiloxanes, such as PDMS (polydimethylsiloxane or silicone rubber) and POMS (polyoctylmethylsiloxane); chlorosulfonated polyethylene; polysilicone-carbonate copolymers; fluoroelastomers; plasticized polyvinylchloride; polyurethane; cis-polybutadiene; cis-polyisoprene; poly(butene-1); styrene-based copolymers; thermoplastic polyolefin elastomers, and block copolymers of polyethers, polyamides and polyesters.

Silicone rubber is the most preferred material.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. To provide countercurrent flow of the sweep gas stream, the modules preferably take the form of hollow-fiber modules, plate-and-frame modules or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 5 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Turning to the operating conditions of step 5, the separation of components achieved by the membrane unit depends not only on the selectivity of the membrane for the components to be separated, but also on the pressure ratio.

By pressure ratio, we mean the ratio of total feed pressure/total permeate pressure. In pressure driven processes, it can be shown mathematically that the enrichment of a component (that is, the ratio of component permeate concentration/component feed concentration) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to crate a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure-ratio limited. For example, a process in which a membrane selectivity of 15, 20 or above is possible (such as is the case for many organic compound/inert gas separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 8, thereby preventing the permeate side concentration building up to a limiting level. This mode of operation can be used with a pressure ratio of 1, that is, with no total pressure difference between the feed and permeate sides, or with a relatively modest pressure ratio of less than 10 or less than 5, for example.

The driving force for transmembrane permeation is supplied by lowering the partial pressure of the desired permeant on the permeate to a level below its partial pressure on the feed side. The use of the sweep gas stream 8 maintains a low feedstock reagent partial pressure on the permeate side, thereby providing driving force.

The partial pressure on the permeate side may be controlled by adjusting the flow rate of the sweep stream to a desired value. In principle the ratio of sweep gas flow to feed gas flow may be any value that provides the desired results, although the ratio sweep gas flow:feed gas flow will seldom be less than 0.1 or greater than 10. High ratios (that is, high sweep flow rate) achieve maximum feedstock recovery from the feed, but a comparatively feedstock dilute permeate stream (that is, comparatively low feedstock enrichment in the sweep gas exiting the modules). Low ratios (that is, low sweep flow rate) achieve higher concentrations of feedstock in the permeate, but relatively low levels of feedstock recovery from the feed.

Use of a too low sweep rate may provide insufficient driving force for a good separation, and use of an overly high sweep flow rate may lead to pressure drop or other problems on the permeate side, or may adversely affect the stoichiometry in the reaction vessel.

Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force is provided by the sweep mode operation.

Optionally, additional driving force may be provided by keeping the total feed pressure higher than the total permeate pressure, such as by compressing the feed stream, or drawing a partial vacuum on the permeate side, or both. In those circumstances where the off-gas is available at above atmospheric pressure, such as at 2 or 3 bar, for example, it is useful and preferred to operate by feeding the off-gas to the membranes without reducing this pressure. Likewise, in those circumstances where the sweep gas is air, it is simple and preferred to maintaining the permeate side at about atmospheric pressure. In some cases, the specific operating conditions of the reaction step may make it desirable to maintain above-atmospheric pressure, such as 2 or 3 bar, on the permeate side, to facilitate return of the recovered feedstock to the reaction zone.

To aid in further understanding of the invention, the process is now described in more detail as it relates to a specific process, namely the manufacture of maleic anhydride by oxidation of n-butane. This description is intended to be illustrative of a typical reaction process and is not intended to limit the scope of the invention. Those of skill in the art will appreciate how to practice the invention as it applies to other oxidation processes, such as those using oxygen-enriched air or oxygen as feed, as well as other types of reaction processes, by following the teachings herein.

Figure 2:
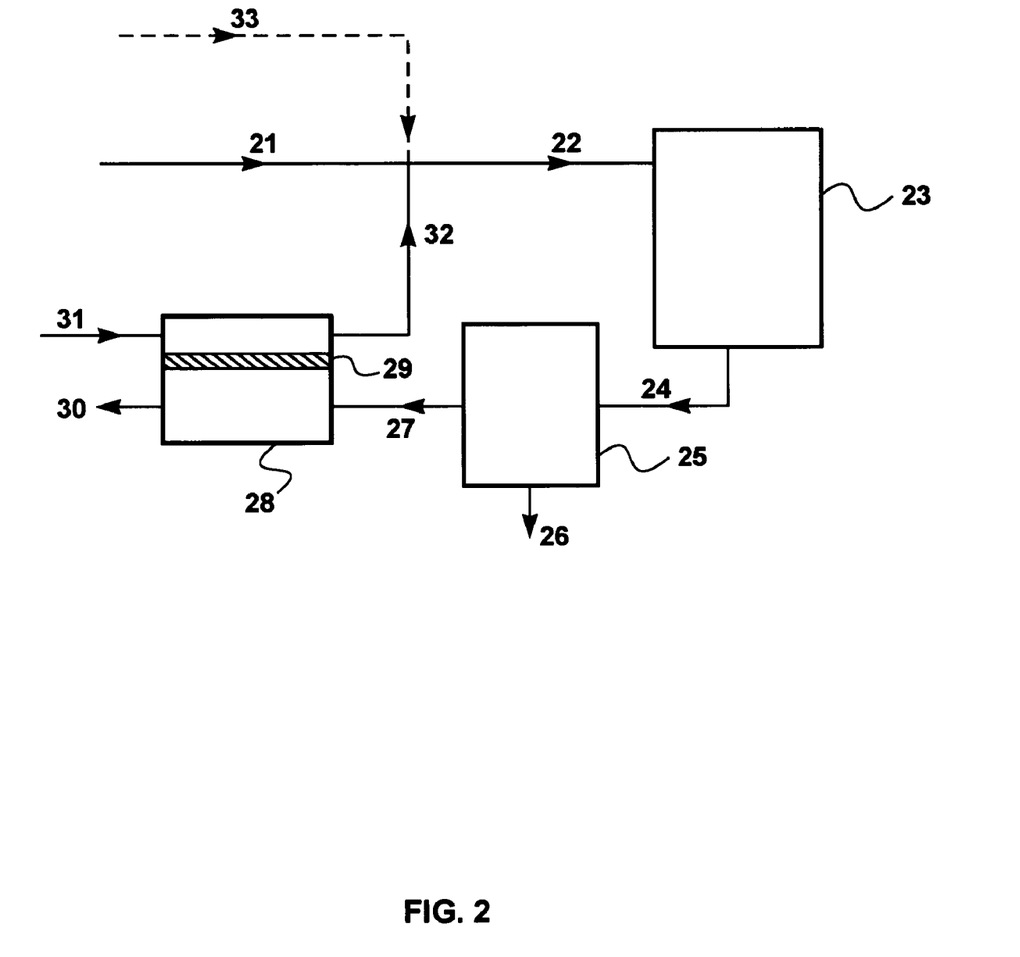
FIG. 2 is a schematic drawing of a flow scheme for an embodiment of the invention as it relates to a petrochemical manufacturing process in which a light organic feedstock is oxidized to produce the desired petrochemical.

The production of maleic anhydride from n-butane is an example of a catalytic process that produces a hydrocarbon-containing purge stream. A typical simple process flow scheme is shown in FIG. 2. It will be appreciated by those of skill in the art that this, like FIG. 1, is a very simple block diagram, intended to make clear the key unit operations of the process of the invention, and that an actual process train will usually include many additional steps of a standard type, such as heating, chilling, compressing, condensing, pumping, various types of separation and/or fractionation, as well as monitoring of pressures, temperatures and flows, and the like. It will also be appreciated by those of skill in the art that the details of the unit operations may differ from product to product.

In the case of maleic anhydride production, reagent A is n-butane, introduced in raw feedstock stream, 21, and reagent B is oxygen, introduced in air sweep stream 31. Optionally, an additional air stream may be introduced directly to the reactor as shown by dashed line, 33.

These streams are generally, although not necessarily, combined and introduced as a single reactor feed stream, 22, to reactor or reaction step, 23. The feed stream normally contains a few percent n-butane, such as about 2-3 vol %.

The reaction is generally carried out using a vanadium-oxide based catalyst, and is performed at high temperature, such as 400-500° C. Preferred reactor types are a multitube fixed bed reactor or a circulating fluidized bed reactor.

The reaction is an equilibrium reaction and does not achieve complete conversion of butane to maleic anhydride. Typically about 20% of the butane will leave the reactor unconverted in stream 24.

A reaction stream in the gas phase is withdrawn from the reaction step(s) as stream, 24, and is passed to product recovery step or steps, 25. These steps can involve cooling the reaction gases to 120° C, thereby condensing the maleic anhydride product, or may include a series of steps including absorption into a solvent, followed by stripping and further product purification.

After recovery of maleic anhydride product stream, 26, an off-gas stream comprising nitrogen, unreacted n-butane, and oxygen is removed as an overhead stream, 27. The off-gas stream may contain any concentration of n-butane. From a typical recovery train, the off-gas or purge stream, 27, is very dilute with respect to n-butane, containing about 0.5% n-butane and 13-16% oxygen, with component C, nitrogen in this case, essentially making up the balance. The flow rate of a typical off-gas stream is such that, even at 0.5% n-butane, the amount of butane lost in this stream can amount to thousands of pounds hour.

The purge or off-gas stream is passed to membrane separation step or steps, 28. This step is carried out using membranes, 29, that are selective for component A over component C, in this case, n-butane over nitrogen, as well as for n-butane over component C, in this case oxygen. Preferably, the membranes provide n-butane permeance of at least about 100 gpu and n-butane/nitrogen selectivity of at least about 15 under process operating conditions. Most preferably, silicone rubber is used for the selective layer of the membranes.

Off-gas stream, 27, as withdrawn from the recovery steps of the reactor train, is usually at a pressure of about 3 bar. The stream is passed without further compression to the feed inlet of membrane separation step, 28. Optionally and less preferably, the stream may be compressed to raise the feed pressure for the membrane separation process.

The off-gas stream flows across the feed side of the membrane; air sweep stream, 31, is introduced to the permeate side inlet of the membrane unit and flows across the permeate side, preferably in a flow pattern that is at least partly or substantially countercurrent to the flow pattern on the feed side. Most simply, but not necessarily, the air is pumped through the membrane units at about atmospheric pressure. The ratio of the inlet flow rates of the feed and sweep streams is preferably maintained at roughly 1:1, such that the sweep stream flow rate is between about 85% and 115% of the feed flow rate Waste stream, 30, is depleted in n-butane and is discharged from the process. By following the teachings of the invention, it is possible to reduce the n-butane concentration of the discharged off-gas by at least 90%, and often by as much as 95% or even 99%. Thus, the n-butane concentration of stream 30 can be as low as 0.05%, 0.03% or less. More importantly, the recovery of butane in stream 32 on a mass basis can be as high as 90wt %, 95 wt % or more. Such a high level of recovery is practically impossible with processes that are purely pressure driven, as the energy requirements to operate the process and the membrane area needed to reach the desired levels of n-butane capture are excessive.

The invention is now further described by the following examples, which are intended to be illustrative of the invention, but are not intended to limit the scope or underlying principles in any way.

EXAMPLES

Example 1

Not in Accordance with the Invention

A computer calculation was performed to illustrate a conventional maleic anhydride production process, without recovery of n-butane feedstock. All calculations for this and the other examples were performed with a modeling program, ChemCad 5.5 (ChemStations, Inc., Houston, Tex.), containing code for the membrane operation developed by MTR's engineering group. For the calculations, all compressors and vacuum pumps were assumed to be 70% efficient.

The modeled plant was assumed to use 10,000 lb/h of n-butane, of which 8,000 lb/h are converted to maleic anhydride in a single-pass oxidation reactor. The reactor was assumed to operate at 3 bar.

Figure 3:
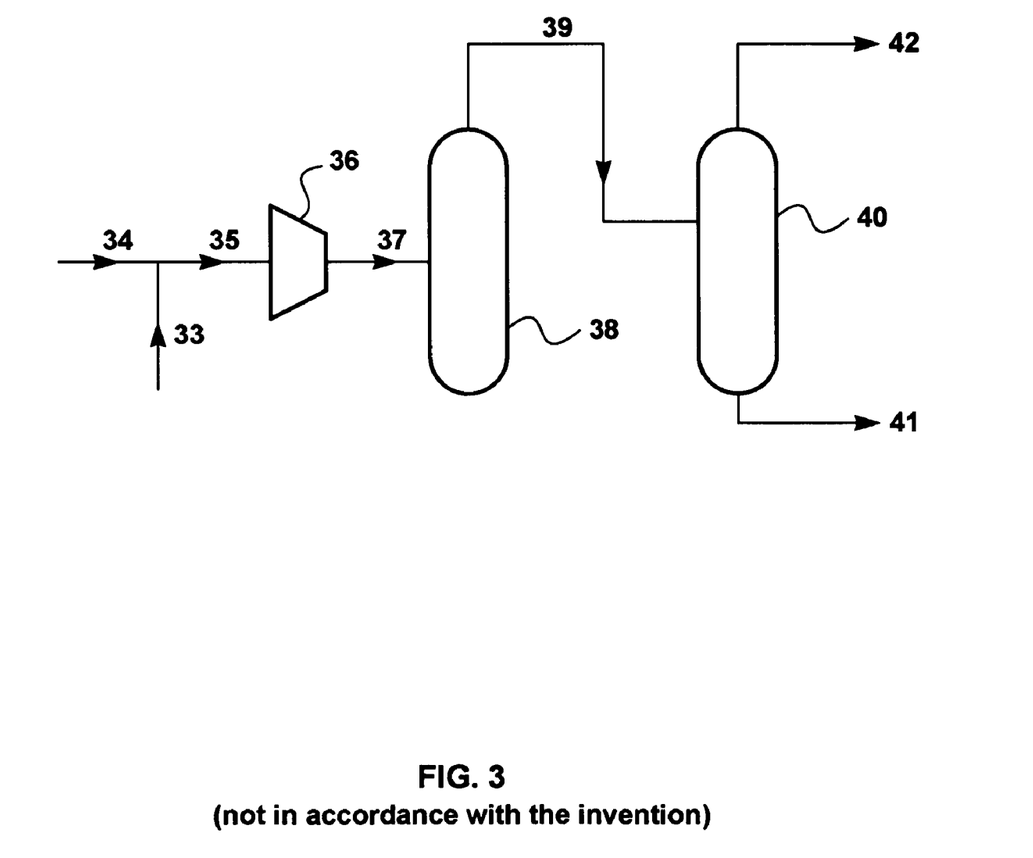
FIG. 3, not in accordance with the invention is a flow diagram of a conventional process for manufacturing an organic compound by oxidation of a light hydrocarbon feedstock.

The process flow scheme is shown in FIG. 3. Referring to this figure, n-butane feed, stream 33, is mixed with air feed, stream 34, to form stream, 35, which is compressed to 3 bar in compression step, 36, to form compressed feedstock stream, 37. This stream is introduced into reactor, 38, from which raw reaction product, stream, 39, is withdrawn. The raw product is introduced into purification step or steps, 40, where the water produced in the reactor is removed (stream not shown on figure), and from which maleic anhydride product stream, 41, and vent or purge stream, 42, are withdrawn.

The results of the calculation are shown in Table 1.

Example 2

Not in Accordance with the Invention

Figure 4:
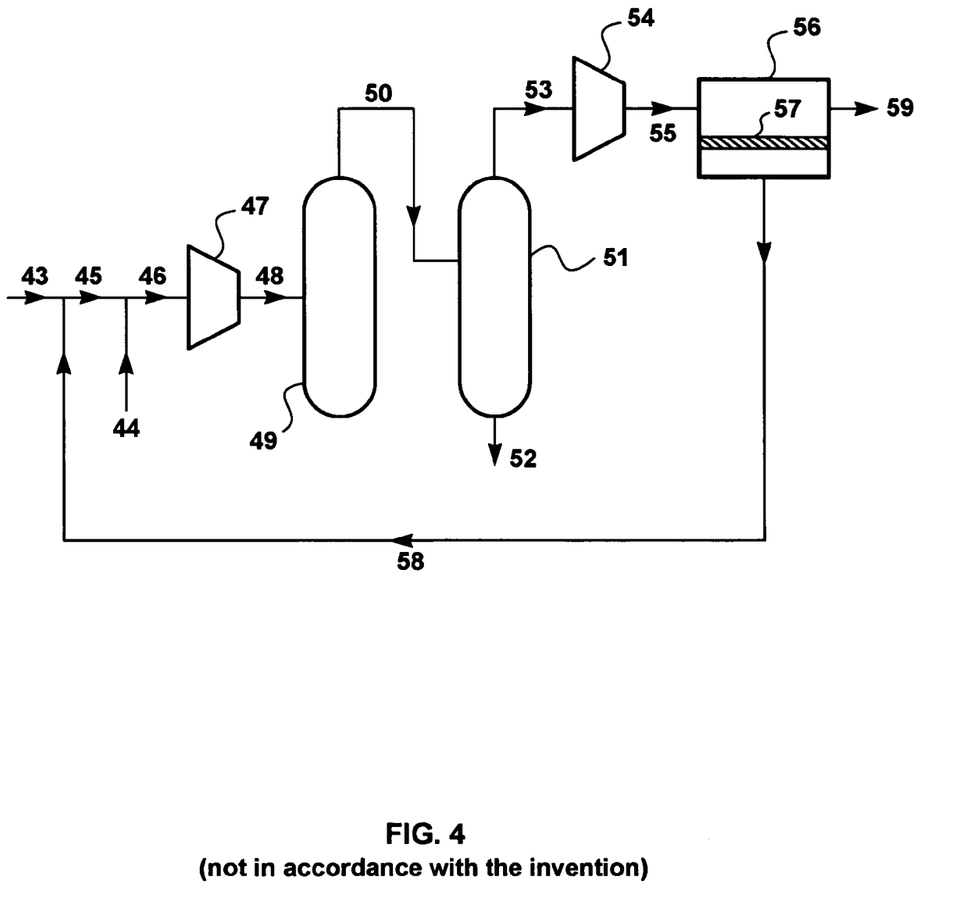
FIG. 4, not in accordance with the invention is a flow diagram of a conventional process for manufacturing an organic compound by oxidation of a light hydrocarbon feedstock, in which the overhead from a product recovery step is compressed and treated by pressure-driven membrane separation.

The calculation of Example 1 was repeated, but this time assuming that n-butane recovery was attempted by treating the vent stream by membrane separation, as shown in FIG. 4. Referring to this figure, n-butane feed, stream 43, is mixed in any order with recovered feedstock stream, 58, and air feed stream, 44, to form streams 45 and then 46. Stream 46 is compressed to 3 bar in compression step, 47, to form compressed feedstock stream, 48. This stream is introduced into reactor, 49, from which raw reaction product, stream 50, is withdrawn. The raw product is introduced into purification step or steps, 51, from which maleic anhydride product stream, 52, and vent or purge stream, 53, are withdrawn.

Stream 53 is compressed in compression step, 54, and the resulting compressed stream, 55, is introduced as feed to membrane separation step or unit, 56. The step was assumed to be carried out using membranes, 57, that have an n-butane/nitrogen selectivity of 15, an n-butane/oxygen selectivity of 7.5, and an n-butane permeance of 3,750 gpu. The permeate pressure was assumed to be maintained at atmospheric pressure.

TABLE 1

| | Stream | | | | | |
|---|---|---|---|---|---|---|
| | 34 (n-Butane feed) | 33 (Air feed) | 37 (Reactor feed) | 41 (Product) | Water | 42 (Purge stream) |
| Flow (lb/h) | 10,000 | 130,180 | 140,180 | 14,340 | 7,900 | 117,640 |
| Temp (° C.) | 30 | 30 | 130 | 30 | 30 | 30 |
| Pressure (bar) | 1.0 | 1.0 | 3.0 | 3.0 | 3.0 | 3.0 |
| Component (mol %) | | | | | | |
| n-Butane | 100 | — | 3.7 | — | — | 0.63 |
| Nitrogen | — | 79 | 76.1 | — | — | 87.0 |
| Oxygen | — | 21 | 20.2 | — | — | 12.4 |
| Maleic anhydride | — | — | — | 100 | — | — |
| Water | — | — | — | — | 100 | — |
| Component (lb/h) | | | | | | |
| n-Butane | 10,000 | — | 10,000 | — | — | 1,500 |
| Nitrogen | — | 99,860 | 99,860 | — | — | 99,860 |
| Oxygen | — | 30,320 | 30,320 | — | — | 16,280 |
| Maleic anhydride | — | — | — | 14,340 | — | — |
| Water | — | — | — | — | 7,900 | — |

As can be seen, 1,500 lb/h of n-butane are lost in the purge stream. The compressor horsepower requirement is 2,530 hp.

The membrane separation step produces an n-butane enriched permeate stream, 58, which is recirculated as dis cussed to the front of the reactor, and an n-butane depleted vent stream, which is discharged from the process.

The results of the calculation are shown in Table 2.

TABLE 2

| | Stream | | | | | | | |
|---|---|---|---|---|---|---|---|---|
| | 43 (n-Butane feed) | 44 (Air) | 48 (Reactor feed) | 50 (Raw product) | 55 (Membrane feed) | 58 (Permeate) | 59 (Vent) | 52 (Product) |
| Flow (lb/h) | 10,000 | 130,180 | 207,420 | 207,080 | 181,210 | 67,240 | 113,970 | 16,670 |
| Temp (° C.) | 30 | 30 | 170 | 200 | 30 | 30 | 30 | 30 |
| Pressure (bar) | 1.0 | 1.0 | 3.0 | 3.0 | 10 | 1.0 | 10 | 3.0 |
| | Component (mol %) | | | | | | | |
| n-Butane | 100 | — | 2.8 | 0.43 | 0.48 | 1.2 | 0.05 | — |
| Nitrogen | — | 79 | 76.6 | 76.6 | 84.9 | 77.7 | 89.0 | — |
| Oxygen | — | 21 | 20.5 | 13.2 | 14.6 | 21.1 | 10.9 | — |
| Maleic anhydride | — | — | — | 2.4 | — | — | — | 100 |
| Water | — | — | — | 7.3 | — | — | — | — |
| | Component (lb/h) | | | | | | | |
| n-Butane | 10,000 | — | 11,630 | 1,740 | 1,740 | 1,630 | 120 | — |
| Nitrogen | — | 99,860 | 149,950 | 149,950 | 149,950 | 50,100 | 99,860 | — |
| Oxygen | — | 30,320 | 45,840 | 29,520 | 29,520 | 15,520 | 14,000 | — |
| Maleic anhydride | — | — | — | 16,670 | — | — | — | 16,670 |
| Water | — | — | — | 9,190 | — | — | — | — |

As can be seen, the process reduces n-butane losses to 120 lb/h, that is, it achieves n-butane utilization in the process of 98.9%.

The process uses 3,300 m² of membrane area, and compression hp for compression step 47 of 5,500 hp and for compression step 54 of 5,400 hp, for a total of 10,900 hp.

Example 3

Not in Accordance with the Invention

The calculation of Example 2 was repeated, but this time assuming that additional compression step, 54, is omitted, so that the membrane feed stream is at 3 bar and the permeate stream is at 1 bar. The membrane area available for the separation was assumed to be 3,300 m², so as to be the same as the value in Example 2.

The results of the calculation are shown in Table 3.

TABLE 3

| | Stream | | | | | | | |
|---|---|---|---|---|---|---|---|---|
| | 43 (n-Butane feed) | 44 (Air) | 48 (Reactor feed) | 50 (Raw product) | 55 (Membrane feed) | 58 (Permeate) | 59 (Vent) | 52 (Product) |
| Flow (lb/h) | 10,000 | 130,180 | 154,810 | 154,510 | 131,350 | 14,640 | 116,720 | 14,930 |
| Temp (° C.) | 30 | 30 | 170 | 200 | 30 | 30 | 30 | 30 |
| Pressure (bar) | 1.0 | 1.0 | 3.0 | 3.0 | 3.0 | 1.0 | 3.0 | 3.0 |
| | Component (mol %) | | | | | | | |
| n-Butane | 100 | — | 3.5 | 0.51 | 0.59 | 1.4 | 0.48 | — |
| Nitrogen | — | 79 | 76.6 | 76.6 | 86.8 | 81.1 | 87.5 | — |
| Oxygen | — | 21 | 20.0 | 11.2 | 12.6 | 17.5 | 12.0 | — |
| Maleic anhydride | — | — | — | 2.9 | — | — | — | 100 |
| Water | — | — | — | 8.8 | — | — | — | — |
| | Component (lb/h) | | | | | | | |
| n-Butane | 10,000 | — | 10,409 | 1,560 | 1,560 | 410 | 1,150 | — |
| Nitrogen | — | 99,860 | 111,270 | 111,270 | 111,270 | 11,420 | 99,860 | — |
| Oxygen | — | 30,320 | 33,140 | 18,530 | 18,530 | 2,820 | 15,710 | — |
| Maleic anhydride | — | — | — | 14,930 | — | — | — | 14,930 |
| Water | — | — | — | 8,230 | — | — | — | — |

As can be seen, the process reduces n-butane losses to 1,150 lb/h, that is, it achieves just under 90% n-butane utilization.

The process uses compression energy of 4,010 hp for compression step, 47. Comparing this example with Example 2, the horsepower requirement is about half, but this is offset by much poorer n-butane recovery.

Example 4

Not in Accordance with the Invention

Figure 5:
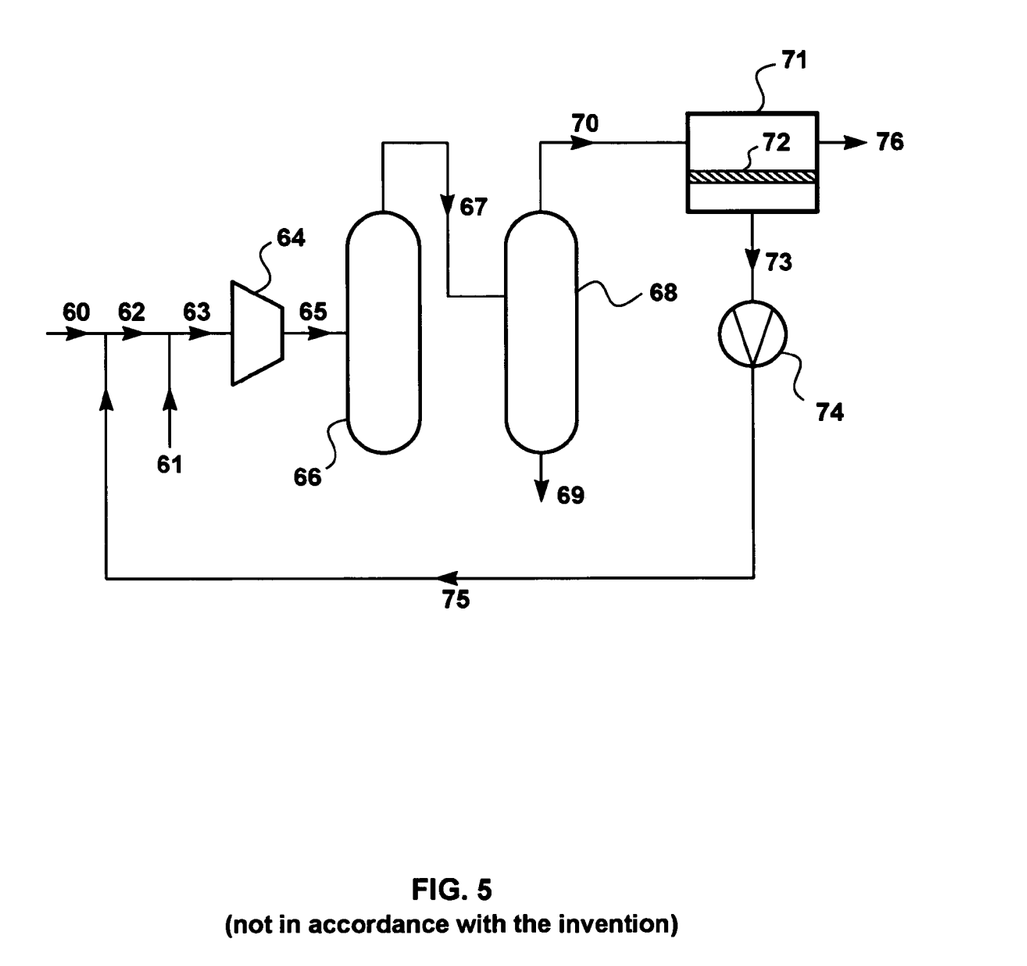
FIG. 5, not in accordance with the invention is a flow diagram of a conventional process for manufacturing an organic compound by oxidation of a light hydrocarbon feedstock, in which the overhead from a product recovery step is treated by pressure-driven membrane separation and a partial vacuum is drawn on the permeate side of the membrane.

The calculation of Example 2 was repeated, but this time assuming that, instead of using compression step 54, the permeate side of the membranes was maintained under partial vacuum. The resulting process flow scheme is shown in FIG. 5.

Referring to this figure, n-butane feed, stream 60, is mixed in any order with recovered feedstock stream, 75, and air feed stream, 61, to form streams 62 and then 63. Stream 63 is compressed to 3 bar in compression step, 64, to form compressed feedstock stream, 65. This stream is introduced into reactor, 66, from which raw reaction product, stream 67, is withdrawn. The raw product is introduced into purification step or steps, 68, from which maleic anhydride product stream, 69, and vent or purge stream, 70, are withdrawn.

Stream 70 is introduced as feed to membrane separation step or unit, 71, which uses membranes, 72, having the same properties as in Example 2. The permeate side of the membranes was assumed to be maintained at 0.1 bar by means of vacuum pump, 74. Permeate stream, 73, is withdrawn from the permeate side through the vacuum pump and passes as recovered feedstock stream, 75, to the front of the process. Vent stream, 76, is discharged.

The results of the calculation are shown in Table 4.

TABLE 4

| | Stream | | | | | | | |
|---|---|---|---|---|---|---|---|---|
| | 60 (n-Butane feed) | 61 (Air) | 65 (Reactor feed) | 67 (Raw product) | 70 (Membrane feed) | 73 (Permeate) | 76 (Vent) | 69 (Product) |
| Flow (lb/h) | 10,000 | 130,180 | 162,580 | 154,510 | 136,980 | 22,400 | 114,580 | 16,290 |
| Temp (° C.) | 30 | 30 | 170 | 200 | 30 | 30 | 30 | 30 |
| Pressure (bar) | 1.0 | 1.0 | 3.0 | 3.0 | 3.0 | 0.1 | 3.0 | 3.0 |
| Component (mol %) | | | | | | | | |
| n-Butane | 100 | — | 3.5 | 0.53 | 0.61 | 3.1 | 0.15 | — |
| Nitrogen | — | 79 | 76.2 | 76.2 | 86.8 | 76.7 | 88.7 | — |
| Oxygen | — | 21 | 20.2 | 11.1 | 12.6 | 20.2 | 11.2 | — |
| Maleic anhydride | — | — | — | 3.1 | — | — | — | 100 |
| Water | — | — | — | 9.2 | — | — | — | — |
| Component (lb/h) | | | | | | | | |
| n-Butane | 10,000 | — | 11,360 | 1,700 | 1,700 | 1,360 | 340 | — |
| Nitrogen | — | 99,860 | 116,030 | 116,030 | 116,030 | 16,180 | 99,860 | — |
| Oxygen | — | 30,320 | 35,190 | 19,240 | 19,240 | 4,870 | 14,370 | — |
| Maleic anhydride | — | — | — | 16,290 | — | — | — | 16,290 |
| Water | — | — | — | 8,980 | — | — | — | — |

As can be seen, the process reduces n-butane losses to 340 lb/h, that is, it achieves 96.6% n-butane utilization in the reactor.

The process uses 1,440 hp of energy for vacuum pump 74 and 4,200 hp for compressor, 64, for a total of 5,640 hp.

Example 5

Process of the Invention

Figure 6:
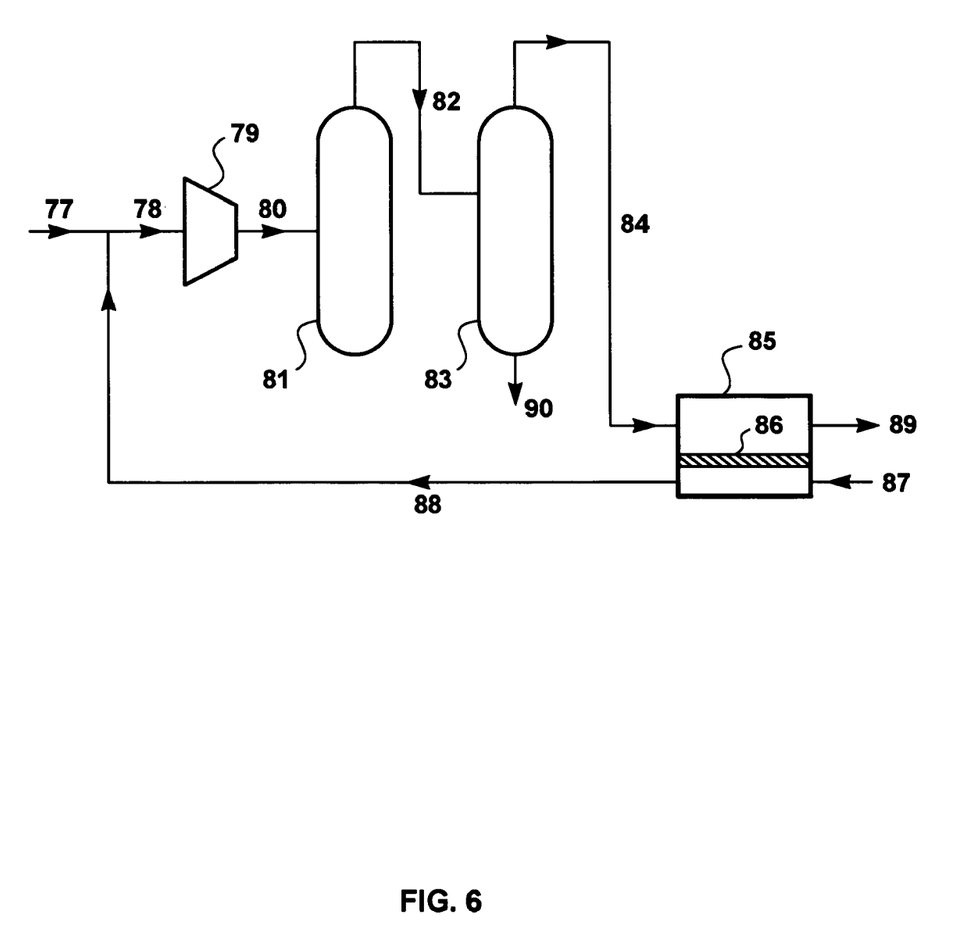
FIG. 6 is a schematic drawing of a flow scheme for an embodiment of the invention as it relates to manufacturing an organic compound by oxidation of a light hydrocarbon feedstock, in which the overhead from a product recovery step is treated by membrane separation in accordance with the invention.

The calculation of Examples 2 and 4 was repeated, but this time assuming that, instead of using either compression step 54 or vacuum pump 74, the permeate side of the membranes was swept by an incoming air flow, as shown in FIG. 6.

Referring to this figure, n-butane feed, stream 77, is mixed with air and recovered feedstock stream, 88, to form stream 78, which is compressed to 3 bar in compression step, 79, to form compressed feedstock stream, 80. This stream is introduced into reactor, 81, from which raw reaction product, stream 82, is withdrawn. The raw product is introduced into purification step or steps, 83, from which maleic anhydride product stream, 90, and vent or purge stream, 84, are withdrawn.

Stream 84 is introduced as feed to membrane separation step or unit, 85, which uses membranes, 86, having the same properties as in Example 2. The feed air stream to the process, 87, is assumed to be introduced at atmospheric pressure as a sweep stream, 87, on the permeate side of the membranes. Combined permeate/sweep stream, 88, is withdrawn from the permeate side and passes to the front of the process. Vent stream, 89, is discharged.

The results of the calculation are shown in Table 5. As can be seen, the process reduces n-butane losses to 260 lb/h, that is, it achieves 97.4% n-butane utilization in the process.

The process uses 3,990 hp for compression step, 79. The butane recovery is almost as good as in Example 2, but the size and cost of the rotating equipment is reduced by more than 50%.

TABLE 5

| | Stream | | | | | | | |
|---|---|---|---|---|---|---|---|---|
| | 77 (n-Butane feed) | 87 (Air sweep) | 80 (Reactor feed) | 82 (Raw product) | 84 (Membrane feed) | 88 (Permeate/ sweep) | 89 (Vent) | 90 (Product) |
| Flow (lb/h) | 10,000 | 130,180 | 154,490 | 154,510 | 128,670 | 144,490 | 114,360 | 16,420 |
| Temp (° C.) | 30 | 30 | 170 | 200 | 30 | 30 | 30 | 30 |
| Pressure (bar) | 1.0 | 1.0 | 3.0 | 3.0 | 3.0 | 1.0 | 3.0 | 3.0 |
| Component (mol %) | | | | | | | | |
| n-Butane | 100 | — | 3.8 | 0.58 | 0.65 | 0.50 | 0.10 | — |
| Nitrogen | — | 79 | 76.8 | 76.8 | 88.2 | 79.4 | 88.8 | — |
| Oxygen | — | 21 | 19.4 | 9.7 | 11.1 | 20.1 | 11.1 | — |
| Maleic anhydride | — | — | — | 3.2 | — | — | — | 100 |
| Water | — | — | — | 9.7 | — | — | — | — |
| Component (lb/h) | | | | | | | | |
| n-Butane | 10,000 | — | 11,450 | 1,720 | 1,720 | 1,450 | 260 | — |
| Nitrogen | — | 99,860 | 110,980 | 111,000 | 111,000 | 111,000 | 99,860 | — |
| Oxygen | — | 30,320 | 32,050 | 15,980 | 15,980 | 32,050 | 14,240 | — |
| Maleic anhydride | — | — | — | 16,420 | — | — | — | 16,420 |
| Water | — | — | — | 9,050 | — | — | — | — |

We claim:

1. A reaction process, comprising:
(a) providing a reaction zone;
(b) introducing a first reaction stream comprising a reagent A and a second reaction stream comprising a reagent B into the reaction zone;
(c) reacting reagents A and B, thereby forming a reaction product in a reaction mixture;
(d) withdrawing at least a portion of the reaction mixture from the reaction zone;
(e) removing at least a portion of the reaction product from the withdrawn portion of the reaction mixture to form a reaction product stream and a non-product stream containing unreacted reagent A and at least one inert component C;
(f) providing a membrane having a feed side and a permeate side, and being selectively permeable to reagent A over component C;
(g) passing at least a portion of the non-product stream across the feed side;
(h) passing a stream containing reagent B as a sweep stream across the permeate side;
(i) withdrawing from the feed side a vent stream depleted in reagent A compared with the non-product stream;
(j) withdrawing from the permeate side a permeate stream comprising reagent A and reagent B;
(k) recirculating at least a portion of the permeate stream to the reaction zone as at least part of the second reaction stream.

2. The process of claim 1, wherein the reaction process is an oxidation process.

3. The process of claim 1, wherein reagent A is chosen from the group consisting of methanol, ethylene, propylene, butylenes, isoprene, ethane, n-butane, iso-butane, benzene, toluene, cyclohexane, cumene, o-xylene and p-xylene.

4. The process of claim 1, wherein component C is nitrogen.

5. The process of claim 1, wherein the sweep stream follows a sweep flow direction across the permeate side, the non-product stream follows a feed flow direction across the feed side, and the sweep flow direction is substantially countercurrent to the feed flow direction.

6. The process of claim 1, wherein the first reaction stream and the second reaction stream are combined before they are introduced into the reaction zone.

7. The process of claim 1, wherein the membrane exhibits a permeance A of at least 100 gpu for reagent A and a selectivity in favor of reagent A over component C of at least 10 under process operating conditions.

8. The process of claim 1, wherein the membrane exhibits a permeance A for reagent A and a permeance B for reagent B and permeance B is less than 20% of permeance A.

9. The process of claim 1, wherein a first total pressure is maintained on the feed side, a second total pressure is maintained on the permeate side and the first total pressure is greater than the second total pressure.

10. The process of claim 9, wherein the second total pressure is at least atmospheric pressure.

11. An oxidation process, comprising:
(a) performing a reaction step in a reaction zone, by reacting an organic feedstock chosen from the group consisting of methanol, ethylene, propylene, butylenes, isoprene, ethane, n-butane, iso-butane, benzene, toluene, cyclohexane, cumene, o-xylene and p-xylene, with oxygen, thereby forming an organic product;
(b) withdrawing from the reaction zone a crude organic product stream comprising the organic product, the organic feedstock, and an inert gas;
(c) removing at least a portion of the organic product from the crude organic product stream to form a non-product stream;
(d) providing a membrane having a feed side and a permeate side, and being selectively permeable to the organic feedstock over nitrogen;
(e) passing at least a portion of the non-product stream across the feed side;
(f) passing air, oxygen-enriched air or oxygen as a sweep stream across the permeate side;
(g) withdrawing from the feed side an organic-feedstock depleted vent stream;
(h) withdrawing from the permeate side a permeate stream comprising oxygen and the organic feedstock;
(i) recirculating at least a portion of the permeate stream to the reaction zone.

12. The process of claim 11, wherein the organic feedstock is selected from the group consisting of propylene and n-butane.

13. The process of claim 11, wherein the organic product is chosen from the group consisting of alcohols, aldehydes, ketones, acids, and esters.

14. The process of claim 11, wherein the organic product is chosen from the group consisting of maleic anhydride, acetic acid, acrylonitrile, acrylic acid and formic acid.

15. The process of claim 11, wherein the inert gas is nitrogen and the membrane exhibits a nitrogen permeance of at least 100 gpu under process operating conditions.

16. The process of claim 11, wherein the membrane exhibits a selectivity in favor of the organic feedstock over nitrogen of at least 10 under process operating conditions.

17. The process of claim 11, wherein the membrane exhibits a permeance A for the organic feedstock and a permeance B for oxygen and permeance B is less than 20% of permeance A.

18. The process of claim 11, wherein a first total pressure is maintained on the feed side, a second total pressure is maintained on the permeate side and the first total pressure is greater than the second total pressure.

19. The process of claim 18, wherein the second total pressure is at least atmospheric pressure.

20. The process of claim 11, wherein the sweep stream follows a sweep flow direction across the permeate side, the non-product stream follows a feed flow direction across the feed side, and the sweep flow direction is substantially countercurrent to the feed flow direction.

* * * * *